No. 898,308. PATENTED SEPT. 8, 1908.
G. H. BROADWATER.
WALL PAPER MEASURING DEVICE.
APPLICATION FILED MAY 13, 1907.
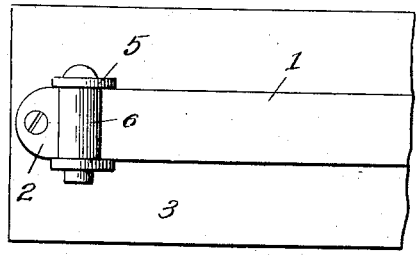
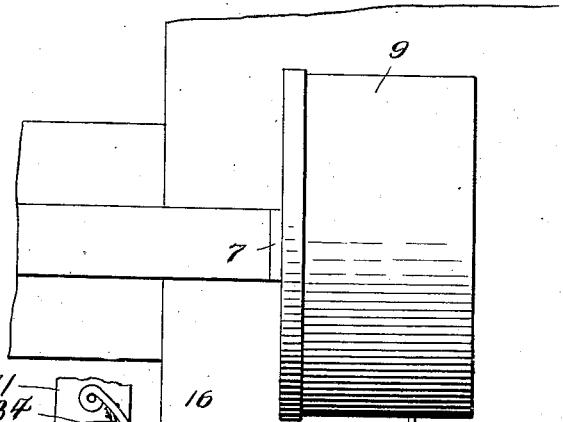
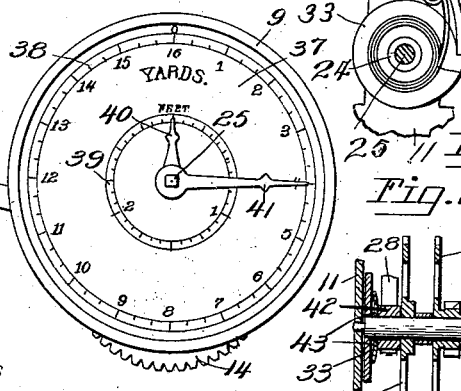
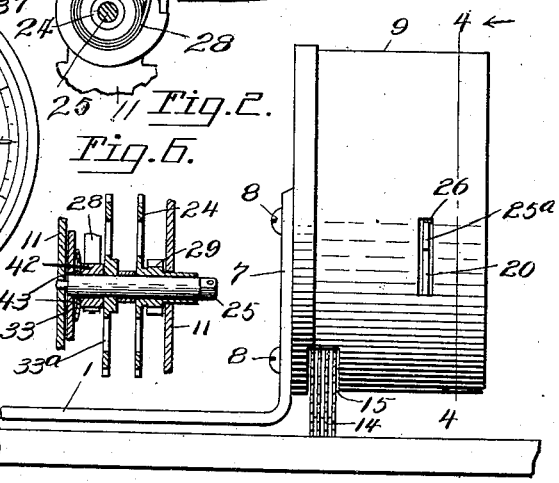
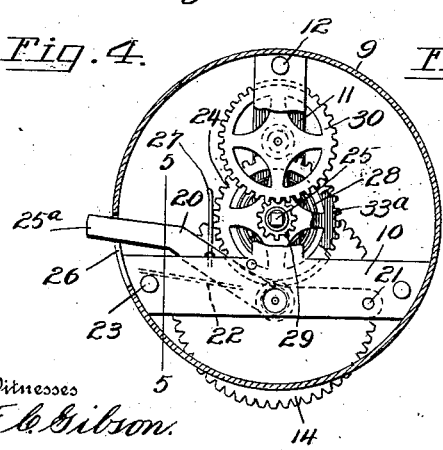
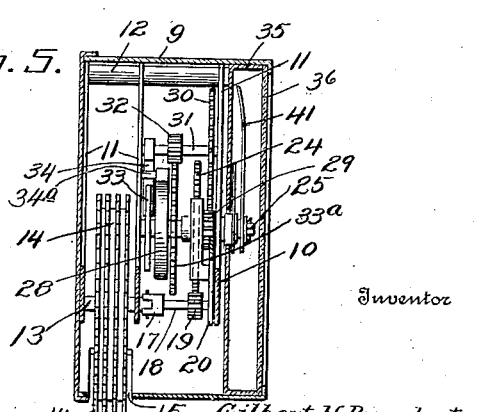
Witnesses
F. C. Gibson.
Inventor
Gilbert H. Broadwater.
By Victor J. Evans
Attorney

UNITED STATES PATENT OFFICE.

GILBERT H. BROADWATER, OF THOMAS, WEST VIRGINIA.

WALL-PAPER-MEASURING DEVICE.

No. 898,308.      Specification of Letters Patent.      Patented Sept. 8, 1908.

Application filed May 13, 1907. Serial No. 373,468.

*To all whom it may concern:*

Be it known that I, GILBERT H. BROADWATER, a citizen of the United States of America, residing at Thomas, in the county of Tucker and State of West Virginia, have invented new and useful Improvements in Wall-Paper-Measuring Devices, of which the following is a specification.

This invention relates to wall paper measuring devices, and one of the principal objects of the same is to provide a device for engaging the margin of wall paper during the time it is being trimmed, to indicate the number of yards passed through the trimmer.

Another object of the invention is to provide a simple device for measuring and indicating the number of yards in a piece or pieces of wall paper, and to provide means by which the indicator will return to zero, said measuring and indicating device being mounted upon a pivoted arm so that it can be swung up out of the way when not required for use.

These and other objects may be attained by means of the construction illustrated in the accompanying drawings, in which:—

Figure 1 is a plan view of a wall paper measuring device made in accordance with my invention. Fig. 2 is a side elevation of the same. Fig. 3 is a face view of the indicator. Fig. 4 is a vertical sectional view on the line 4—4 of Fig. 2, looking in the direction indicated by the arrow. Fig. 5 is a vertical sectional view on the line 5—5 of Fig. 4. Fig. 6 is a detail section taken in line with the main shaft. Fig. 7 is a detail view showing the manner of connecting one end of the spring and pin on the frame.

Referring to the drawing for a more particular description of my invention, the numeral 1 designates a supporting arm pivotally connected to a suitable bracket 2 secured to a base 3, said arm 1 being connected to the bracket 2 by means of a pin 4 which extends through the upturned ears 5 of the bracket and through a curled portion 6 of the arm 1. The opposite end of the arm 1 is bent upward, as at 7, and secured to the portion 7 by means of screws 8 is the casing 9 of the measuring device and indicator.

Mounted in the casing 9 is a frame 10 having upright portions 11 connected at their upper ends by means of a bolt or pin 12. Journaled in the frame 11 is a shaft 13 on which is rigidly secured a series of notched bearing wheels 14 which project through an opening 15 in the casing and are adapted to bear upon the surface of the wall paper 16 as it passes from the roll through the edge trimmer. Connected to the inner end of the shaft 13 by means of a ball and socket or other suitable flexible connection 17, is a shaft 18 carrying a pinion 19, the end of said shaft 18 being mounted to rotate in a lever 20 pivoted at 21 Fig. 4 to the frame 10. A spring 22 connected to the lever 20 bears at its free end upon a cross pin or bearing 23, and the function of this spring is to hold the lever and the shaft 18 upward to engage the pinion 19 with a gear wheel 24 mounted upon a shaft 25. The end $25^a$ of the lever 20 projects through an opening 26 in the side of the casing 9. Secured to the lever 20 is a spring brake 27 adapted to bear normally against the teeth of the gear wheel 24 to prevent the unwinding of a spring 28 mounted on a drum on the shaft 25. A pinion 29 carried by a collar fitted to the shaft 25 engages a gear wheel 30 journaled in the upright portions 11 of the frame on the shaft 31, and carried by said shaft 31 is a pinion 32 which engages a gear wheel $33^a$ on the shaft 25. A disk 33 Figs. 5 and 7 on the shaft 25 is provided with a notch which is engaged by a spring pawl 34 mounted on the shaft 31, the purpose of which pawl is to prevent the hands or pointers from being propelled backward past zero, by the tension of spring 28.

An indicator casing 35 is secured within the casing 9, and a glass plate 36 covers the indicator. A dial 37 provided with yard indicating marks 38 and feet indicating marks 39 is formed on or secured to the casing 35, and a short hand or pointer 40 is connected to the sleeve of the pinion 29, while a long hand or pointer 41 is secured to the squared end of the shaft 25, said long hand adapted to traverse the dial and indicate the number of yards traversed by the notched disks 14 while the short hand 20 indicates the number of feet traversed by said disks.

The operation of my invention may be briefly described as follows: When it is desired to measure the wall paper, the arm 1 is swung down until the disks 14 rest upon the upper surface of the wall paper near one edge thereof, and as the opposite edge is being trimmed, the paper is fed through under the disks 14, and the number of feet and yards indicated upon the dial 37. When it is desired to return the hands or pointers 40 and 41 to zero, the projecting end $25^a$ of the lever 20 is depressed against the tension of spring 22, and when said lever is depressed the pinion 19 is disengaged from the gear wheel 24, while the brake spring 27 is also thrown out of engagement with the teeth of said gear wheel, when the hands are automatically moved back to the zero point by the tension of spring 28.

Loosely mounted upon the shaft 25 is a collar 42 Fig. 6 to which the spring 28 is secured at its inner end and a spring disk 43 bears against the collar 42 and against the disk 33 on shaft 25. The outer end of the spring 28 is connected to a pin 34$^a$ projecting from the upright portion 11 of the frame. The disk 43 is concavo-convex in cross section and hence bears at its periphery upon the disk 33. Normally, the collar 42 rotates with the shaft 25 owing to the friction of the disk 43 against the collar. However, when the spring 28 is wound fully upon the collar 42 said collar will slip upon the shaft 25. When the lever 25$^a$ is depressed the unwinding of the spring 28 will return the hands or pointers 40—41 to the zero point and the pawl 34 will engage a notch in the disk 33 Fig. 7.

Certain changes may be made in the details of the construction of my device without sacrificing any of the features, within the scope of the claims presented.

From the foregoing it will be obvious that a measuring device made in accordance with my invention is of comparatively simple construction, is reliable and efficient in use, is quickly set to zero, can be readily swung up out of the way when not required, and can be produced at slight cost.

Having thus described the invention, what I claim is:

1. In a device of the character described, a measuring and indicating device mounted upon an arm pivoted to a support, said measuring and indicating device comprising a casing, a series of notched bearing disks projecting through the casing, a train of gearing within the casing, indicator hands, a dial, a spring for returning the hands to the zero point, and a lever and intermediate parts for holding and releasing said spring.

2. In a device of the character described, a casing mounted on a pivoted arm and provided with a series of bearing disks mounted on a shaft within the casing, said shaft comprising two sections having a flexible connection, a pinion mounted on one of said sections and adapted to engage a gear wheel mounted upon a shaft journaled in the casing, indicator hands and a dial on said casing, a spring within the casing, and a lever for throwing said pinion into and out of engagement with said gear wheel to permit the spring to return the hands to a zero point.

In testimony whereof, I affix my signature in presence of two witnesses.

GILBERT H. BROADWATER

Witnesses:
  NORA EVERETT,
  C. O. STRIEBY.